United States Patent
Trolez et al.

(10) Patent No.: US 10,053,563 B2
(45) Date of Patent: Aug. 21, 2018

(54) PROCESS FOR PRODUCING HIGH DENSITY POLYETHYLENE COMPOSITION HAVING HIGH ENVIRONMENTAL STRESS CRACK RESISTANCE FROM POST CONSUMER PLASTIC AND ARTICLES MADE OF SAID COMPOSITION

(71) Applicant: TOTAL RESEARCH & TECHNOLOGY FELUY, Seneffe (BE)

(72) Inventors: Yves Trolez, Arquennes (BE); Aurélien Vantomme, Mignault (BE); Jurjen Meeuwissen, Amsterdam (BE)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 0 days.

(21) Appl. No.: 15/120,200

(22) PCT Filed: Jul. 2, 2015

(86) PCT No.: PCT/EP2015/065106
§ 371 (c)(1),
(2) Date: Aug. 19, 2016

(87) PCT Pub. No.: WO2016/005265
PCT Pub. Date: Jan. 14, 2016

(65) Prior Publication Data
US 2017/0107364 A1  Apr. 20, 2017

(30) Foreign Application Priority Data
Jul. 10, 2014 (EP) .................... 14176463

(51) Int. Cl.
*C08L 23/06* (2006.01)

(52) U.S. Cl.
CPC ......... *C08L 23/06* (2013.01); *C08L 2205/025* (2013.01); *C08L 2205/06* (2013.01); *C08L 2207/062* (2013.01); *C08L 2207/20* (2013.01); *C08L 2314/02* (2013.01)

(58) Field of Classification Search
CPC .... C08J 3/005; C08J 2323/06; C08J 2400/30; C08L 23/04; C08L 23/06; C08L 2205/02; C08L 2205/025; C08L 2205/03; C08L 2205/06; C08L 2203/10; C08L 2207/062; C08L 2207/20; C08L 2314/02
See application file for complete search history.

(56) References Cited

U.S. PATENT DOCUMENTS

| | | |
|---|---|---|
| 5,106,804 A | 4/1992 | Bailly et al. |
| 5,153,158 A | 10/1992 | Kioka et al. |
| 5,594,071 A | 1/1997 | Takahashi et al. |
| 5,693,391 A | 12/1997 | Herman et al. |
| 6,174,971 B1 | 1/2001 | Chen et al. |
| 6,486,274 B1 | 11/2002 | Gray et al. |
| 6,693,058 B1 | 2/2004 | Gray et al. |
| 6,734,134 B1 | 5/2004 | Gray et al. |
| 6,864,207 B2 | 3/2005 | Knoeppel et al. |
| 6,916,895 B2 | 7/2005 | Gray et al. |
| 6,930,071 B2 | 8/2005 | Knoeppel et al. |
| 2004/0157988 A1* | 8/2004 | Miserque ............. C08F 210/16 525/53 |

FOREIGN PATENT DOCUMENTS

| | | |
|---|---|---|
| EP | 0654496 A2 | 5/1995 |
| EP | 1584652 A1 | 10/2005 |
| WO | 9618677 A1 | 6/1996 |
| WO | 2005032714 A1 | 4/2005 |
| WO | 2012139967 A1 | 10/2012 |

OTHER PUBLICATIONS

Kirk-Othmer Encyclopedia of Chemical Technology, Fifth Edition, vol. 26, John Wiley & Sons, Inc. Hoboken, New Jersey, USA, 2007; pp. 502 to 554.
International Search Report issued in PCT/EP2015/065106, dated Sep. 8, 2015, 3 pages.
Plastics Additives Handbook, ed. H. Zweifel, 5th edition, 2001, Hanser Publishers.

* cited by examiner

*Primary Examiner* — Irina S Zemel
*Assistant Examiner* — Jeffrey S Lenihan
(74) *Attorney, Agent, or Firm* — Albert Shung

(57) ABSTRACT

A process may include providing a polyethylene post consumer resin, providing a virgin polyethylene resin, and blending the polyethylene post consumer resin with the virgin polyethylene resin to produce a composition. The polyethylene post consumer resin may have an ESCR of at most 10 hours, a density ranging from 0.950 to 0.967 g/cm$^3$, and an HLMI of 40 to 70 g/10 min. The virgin polyethylene resin may include fractions A and B, with fraction A having a higher molecular weight and lower density than fraction B. Fraction A may have an HL275 of at least 0.1 g/10 min and of at most 4 g/10 min, and a density of at least 0.920 g/cm$^3$ and of at most 0.942 g/cm. The virgin polyethylene resin may have an HLMI of 5 to 75 g/10 min, and a density ranging from 0.945 to 0.960 g/cm$^3$.

18 Claims, No Drawings

PROCESS FOR PRODUCING HIGH DENSITY POLYETHYLENE COMPOSITION HAVING HIGH ENVIRONMENTAL STRESS CRACK RESISTANCE FROM POST CONSUMER PLASTIC AND ARTICLES MADE OF SAID COMPOSITION

CROSS-REFERENCE TO RELATED APPLICATIONS

This application is a National Stage Entry of PCT/EP2015/065106, filed on Jul. 2, 2015; which itself claims priority from EP 14176463.9, filed on Jul. 10, 2014. The entireties of both PCT/EP2015/065106 and EP 14176463.9 are incorporated herein by reference.

FIELD OF INVENTION

The invention relates to a process for recycling high density polyethylene (HDPE) waste from domestic polymer waste to obtain a polyethylene blend having excellent mechanical properties.

BACKGROUND OF THE INVENTION

Polyethylene is used in the production of various products and for example of blow molded products such as bottles and containers. Examples of such blow molded products include consumer/household containers such as detergent bottles, shampoo bottles, and the like; industrial containers such as carry cases for hardware/tools, containers for argricultural chemicals, photochemicals; and industrial parts.

Blow molding is accomplished by extruding molten polyethylene resin into a mold cavity as a parison or a hollow tube while simultaneously forcing air into the parison so that the parison expands, taking on the shape of the mold. The molten polyethylene cools within the mold until it solidifies to produce the desired molded product.

The blow molded products made from polyethylene or polyethylene blends offer relatively good strength and other performance properties. It is desirable that the final polyethylene or polyethylene blend product exhibits good physical properties such as good drop impact, stiffness and good environmental stress crack resistance (ESCR).

In our days it is desirable to attempt to recycle and reuse plastic materials, commonly known as post consumer resin (PCR). However, such recycling in attempts to make containers such as bottles, resulted in the obtaining of poor mechanical properties in the final products obtained. In particular, the containers produced from recycled polyethylene may show poor environmental stress crack resistance (ESCR).

To enhance said properties, it is known to blend such post consumer resin with virgin material. Such a process is for example described in WO2012/139967 where HDPE detergent packaging waste was selected for its ESCR properties (ESCR 100% ranging from 20 to 60 hours) and blended with virgin HDPE. However the use of detergents bottles which are colourful and have contained chemical products resulted in the production of articles containing recycled polymer having good mechanical properties but showing a grey colour and being smelly.

EP0654496 and U.S. Pat. No. 5,693,391 disclose a light-weight plastic container having stress crack resistance and comprising at least one layer comprising post consumer milk resin blended with virgin HDPE copolymer resin. The virgin HDPE copolymer resin selected has a density of at least 0.94 g/mL and a melt index of less than 0.5 g/10 min. However the results obtained are not entirely satisfactory and it is desirable to improve them.

There remains a need in the industry to better valorise plastic waste. Thus it is desirable to develop a polyethylene composition comprising recycled material, and blow moulded products produced from that composition, that shows at the same time good mechanical properties such as a good rigidity and ESCR, with good processability for applications such as blow moulding application.

There remains also a need in the industry to develop a polyethylene composition comprising recycled material, and blow moulded products produced from that composition, that shows at the same time good mechanical properties such as a good rigidity and ESCR, with good processability for applications such as blow moulding application, and with good properties regarding odour and colour.

SUMMARY OF THE INVENTION

The inventors have surprisingly found that the above objectives can be attained either individually or in any combination by recovering a specific PCR and blending it with a specific virgin polyethylene.

According to a first aspect, the invention provides process to produce a polyethylene composition comprising post consumer resin (PCR) comprising the steps of:
  providing a high density polyethylene post consumer resin (PCR) having an ESCR (100%) of at most 10 hours as determined according to ASTM D 1693 (2013) condition B, a density ranging from 0.950 to 0.967 g/cm$^3$ as determined according to ASTM 1505 at a temperature of 23° C., an HLMI of 40 to 70 g/10 min as determined according to ISO 1133, condition G, at 190° C. and 21.6 kg;
  providing a virgin Ziegler-Natta catalyzed polyethylene resin, wherein the virgin polyethylene resin has a multimodal distribution and comprises at least two polyethylene fractions A and B, fraction A having a higher molecular weight and lower density than fraction B, wherein fraction A has a HL275 of at least 0.1 g/10 min and of at most 4 g/10 min as determined according to ISO 1133, condition G, at 190° C. and under a load of 21.6 kg except that a die of 2.75 mm broad was used, and has a density of at least 0.920 g/cm$^3$ and of at most 0.942 g/cm$^3$; and the virgin polyethylene resin having an HLMI of 5 to 75 g/10 min as determined according to ISO 1133, condition G, at 190° C. and 21.6 kg, a density ranging from 0.945 to 0.960 g/cm$^3$, the density being determined according to ASTM 1505 at a temperature of 23° C.;
  blending the high density polyethylene post consumer resin with the virgin polyethylene resin in to form a polyethylene composition, wherein said composition comprises from 15 to 70 wt % of high density polyethylene post consumer resin relative to the total weight of the composition.

With preference, one or more of the following embodiments can be used to further define the inventive process:
  The invention provides process to produce a polyethylene composition comprising post consumer resin (PCR) comprising the steps of:
    providing a high density polyethylene post consumer resin (PCR) having an ESCR (100%) of at most 10 hours as determined according to ASTM D 1693 (2013) condition B, a density ranging from 0.950 to 0.967 g/cm$^3$ as determined according to ASTM 1505 at a temperature of 23° C., an HLMI of 40 to 70 g/10 min as determined according to ISO 1133, condition G, at 190° C. and 21.6 kg;

providing a virgin Ziegler-Natta catalyzed polyethylene resin, wherein the virgin polyethylene resin has a multimodal distribution and comprises at least two polyethylene fractions A and B, fraction A having a higher molecular weight and lower density than fraction B, wherein fraction A has a HL275 of at least 0.2 g/10 min and of at most 4 g/10 min as determined according to ISO 1133, condition G, at 190° C. and under a load of 21.6 kg except that a die of 2.75 mm broad was used, and has a density of at least 0.930 g/cm$^3$ and of at most 0.942 g/cm$^3$; and the virgin polyethylene resin having an HLMI of 5 to 75 g/10 min as determined according to ISO 1133, condition G, at 190° C. and 21.6 kg, a density ranging from 0.953 to 0.960 g/cm$^3$, the density being determined according to ASTM 1505 at a temperature of 23° C.;

blending the high density polyethylene post consumer resin with the virgin polyethylene resin in to form a polyethylene composition, wherein said composition comprises from 15 to 70 wt % of high density polyethylene post consumer resin relative to the total weight of the composition.

The invention provides process to produce a polyethylene composition comprising post consumer resin (PCR) comprising the steps of:

providing a high density polyethylene post consumer resin (PCR) having an ESCR (100%) of at most 10 hours as determined according to ASTM D 1693 (2013) condition B, a density ranging from 0.950 to 0.964 g/cm$^3$ as determined according to ASTM 1505 at a temperature of 23° C., an HLMI of 40 to 70 g/10 min as determined according to ISO 1133, condition G, at 190° C. and 21.6 kg;

providing a virgin Ziegler-Natta catalyzed polyethylene resin, wherein the virgin polyethylene resin has a multimodal distribution and comprises at least two polyethylene fractions A and B, fraction A having a higher molecular weight and lower density than fraction B, wherein fraction A has a HL275 of at least 0.2 g/10 min and of at most 4 g/10 min as determined according to ISO 1133, condition G, at 190° C. and under a load of 21.6 kg except that a die of 2.75 mm broad was used, and has a density of at least 0.930 g/cm$^3$ and of at most 0.942 g/cm$^3$; and the virgin polyethylene resin having an HLMI of 5 to 30 g/10 min as determined according to ISO 1133, condition G, at 190° C. and 21.6 kg, a density ranging from 0.955 to 0.959 g/cm$^3$, the density being determined according to ASTM 1505 at a temperature of 23° C.;

blending the high density polyethylene post consumer resin with the virgin polyethylene resin in to form a polyethylene composition, wherein said composition comprises from 15 to 70 wt % of high density polyethylene post consumer resin relative to the total weight of the composition.

The polyethylene composition satisfies the relationship: wt % PCR≤74−(14.4×HL275$_A$), wherein wt % PCR is the proportion in weight percent of the high density polyethylene post consumer resin in the composition relative to the total weight of the composition and HL275$_A$ is the HL275 of fraction A of the virgin Ziegler-Natta catalyzed polyethylene resin as determined according to ISO 1133, condition G, at 190° C. and under a load of 21.6 kg except that a die of 2.75 mm broad was used.

The polyethylene composition comprises at least 17 wt %, more preferably at least 25 wt %, and even more preferably at least 35 wt % of said PCR, relative to the total weight of the polyethylene composition. The polyethylene composition comprises at most 50 wt %, more preferably at most 45 wt %, even more preferably at most 40 wt % of said PCR relative to the total weight of the polyethylene composition. For example, the polyethylene composition comprises from 25 to 40 wt % of high density polyethylene post consumer resin relative to the total weight of the composition.

The polyethylene composition comprises at most 85 wt %, preferably at most 83 wt %, more preferably at most 75 wt %, and even more preferably at most 60 wt % of virgin polyethylene, relative to the total weight of the polyethylene composition. The polyethylene composition comprises at least 30 wt %, preferably at least 50 wt %, more preferably at least 55 wt % of virgin polyethylene, relative to the total weight of the polyethylene composition.

The high density polyethylene post consumer resin has an ESCR (100%) of at most 10 hours as determined according to ASTM D 1693 (2013) condition B, a density ranging from 0.950 to 0.964 g/cm$^3$ as determined according to ASTM 1505 at a temperature of 23° C., an HLMI of 40 to 70 g/10 min as determined according to ISO 1133, condition G, at 190° C. and 21.6 kg.

The high density polyethylene post consumer resin has an HLMI of at most 60 g/10 min, preferably of at most 55 g/10 min, as determined according to ISO 1133, condition G, at 190° C. and 21.6 kg.

The high density polyethylene post consumer resin has a density of at least 0.954 g/cm$^3$, preferably of at least 0.957 g/cm$^3$ and/or of at most 0.964 g/cm$^3$ as determined according to ASTM 1505 at a temperature of 23° C.

The high density polyethylene post consumer resin has a color L* of at least 60, preferably of at least 70, a*=−10 to 0, preferably from −5 to 0, and b*=0 to 10, preferably from 0 to 5.

The high density polyethylene post consumer resin comprises at most 40 ppm, more preferably at most 25 ppm of limonene.

The high density polyethylene post consumer resin is provided in flake form.

The high density polyethylene post consumer resin is provided in pellet form.

The virgin bimodal HDPE is provided in powder form.

The virgin bimodal HDPE is provided in pellet form.

The high density polyethylene post consumer resin is a dairy waste, preferably milk bottles.

The virgin polyethylene resin has a multimodal distribution and comprises at least two polyethylene fractions A and B, fraction A having a higher molecular weight and lower density than fraction B, wherein fraction A has a HL275 of at least 0.2 g/10 min and of at most 4 g/10 min as determined according to ISO 1133, condition G, at 190° C. and under a load of 21.6 kg except that a die of 2.75 mm broad was used, and has a density of at least 0.930 g/cm$^3$ and of at most 0.942 g/cm$^3$; and the virgin polyethylene resin having an HLMI of 5 to 30 g/10 min as determined according to ISO 1133, condition G, at 190° C. and 21.6 kg, a density ranging from 0.955 to 0.959 g/cm$^3$, the density being determined according to ASTM 1505 at a temperature of 23° C.

Fraction A of the virgin Ziegler-Natta catalyzed polyethylene resin, has a melt index HL275 of at least 0.5 g/10 min preferably at least 0.8 g/10 min, and of at most 4 g/10 min, preferably at most 1.9 g/10 min as measured according to ISO 1133 condition G at a temperature of 190° C. and under a load of 21.6 kg, except that a die of 2.75 mm broad was used.

Fraction A of the virgin Ziegler-Natta catalyzed polyethylene resin, has a density of at least 0.930 g/cm$^3$ and of at most 0.940 g/cm$^3$, more preferably of at most 0.938 g/cm$^3$, as measured according to ASTM 1505 at a temperature 23° C.

Fraction A is present in an amount ranging from at least 40% to at most 50% by weight based on the total weight of the virgin polyethylene resin; preferably ranging from 40% to 45% by weight based on the total weight of the virgin polyethylene resin.

Fractions A and B of the virgin Ziegler-Natta catalyzed polyethylene resin are prepared in different reactors, preferably each reactor is a loop reactor.

Fractions A and B of the virgin Ziegler-Natta catalyzed polyethylene resin are prepared in at least 2 reactors preferably operated in series.

The virgin Ziegler-Natta catalyzed polyethylene resin is prepared in slurry conditions.

The virgin Ziegler-Natta catalyzed polyethylene resin has a molecular weight distribution of at least 10, more preferably of at least 11, and most preferably of at least 12. Molecular weights can be determined by size exclusion chromatography (SEC).

The virgin polyethylene has a density of at least 0.953 g/cm$^3$, preferably of at least 0.954 g/cm$^3$ and more preferably of at least 0.955 g/cm$^3$.

The virgin polyethylene has a density of at most 0.959 g/cm$^3$ as determined according to ASTM 1505 at a temperature of 23° C.

The HLMI of the virgin polyethylene is of at least 10 g/10 min, preferably at least 12 g/10 min, and more preferably of at least 15 g/10 min as determined according to ISO 1133, condition G, at 190° C. and under a load of 21.6 kg.

The HLMI of the virgin polyethylene is at most 50 g/10 min and more preferably at most 30 g/10 min as determined according to ISO 1133, condition G, at 190° C. and under a load of 21.6 kg.

The virgin Ziegler-Natta catalyzed polyethylene resin has an ESCR (10%) of at least 80 hours, preferably at least 150 hours, more preferably of at least 600 hours.

The polyethylene composition has an HLMI of 20 to 50 g/10 min as determined according to ISO 1133, condition G, at 190° C. and 21.6 kg, and wherein the polyethylene composition satisfies the relationship $$HLMIcomp = \left(\frac{1-[PCR]}{HMLIvr} + \frac{[PCR]}{HMLIpcr}\right)^{-1}$$

wherein HLMIcomp is the HLMI of the polyethylene composition, HLMIvr is the HLMI of the virgin Ziegler-Natta catalyzed polyethylene resin, HLMIpcr is the HLMI of the high density polyethylene post consumer resin, [PCR] is the proportion of the high density polyethylene post consumer resin in the polyethylene composition relative to the total weight of the composition such that [PCR]=wt % PCR/100, and wt % PCR is the proportion in weight percent of the high density polyethylene post consumer resin in the polyethylene composition relative to the total weight of the composition.

The polyethylene composition has a ESCR (100%) of at least 80 hours, preferably at least 140 hours, more preferably of at least 500 hours.

The polyethylene composition has a density ranging from 0.957 to 0.962 g/cm$^3$ as determined according to ASTM 1505 at a temperature of 23° C., an HLMI of 20 to 50 g/10 min as determined according to ISO 1133, condition G, at 190° C. and 21.6 kg, and preferably one or more selected from:

a color L* of at least 60, a*=−10 to 0 and b*=0 to 10;

at most 40 ppm, more preferably at most 25 ppm of limonene.

According to a second aspect, the invention provides an article made from the polyethylene composition obtained by the process according to the first aspect or its embodiments, preferably the article is a blow molded article such as a container for food, detergents, lubricants, chemicals or agrochemical products.

DETAILED DESCRIPTION OF THE INVENTION

Before the process according to the invention is described, it is to be understood that this invention is not limited to particular methods, components, or devices described, as such methods, components, and devices may, of course, vary. The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all numbers and fractions subsumed within the respective ranges, as well as the recited endpoints.

Reference throughout this specification to "one embodiment" or "an embodiment" means that a particular feature, structure or characteristic described in connection with the embodiment is included in at least one embodiment of the present invention. The particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

Unless otherwise defined, all terms used in disclosing the invention, including technical and scientific terms, have the meaning as commonly understood by the one ordinary skilled in the art to which this invention belongs. By means of further guidance, definitions for the terms used in the description are included to better appreciate the teaching of the present invention.

The term "polyethylene" is used to denote a homopolymer of ethylene or any copolymer comprising ethylene in at least 50 wt %, relative to the total weight of said copolymer.

The term "high density polyethylene", which may be abbreviated as "HDPE", is generally used to denote polyethylenes having a density of at least 0.940 g/cm$^3$. The term "virgin polyethylene" is used to denote a polyethylene directly obtained from an ethylene polymerization plant. The term "directly obtained" is meant to include that the polyethylene may optionally pass through a pelletization step or an additivation step or both.

The term "Post Consumer Resin", which may be abbreviated as "PCR", is used to denote the component of the domestic waste, which consists of high density polyethylene packaging.

Ziegler-Natta catalyst systems are generally formed from the combination of a metal component (e.g., a catalyst precursor) with one or more additional components, such as a catalyst support, a cocatalyst and/or one or more electron donors, for example.

For the process of the invention, the PCR comprises non-black HDPE. The PCR is preferably selected from HDPE dairy packaging waste, such as English milk bottles. The selected PCR may comprise up to 10 wt % relative to the total weight of the PCR, of one or more of:
- polymers different from polyethylene (such as for example polypropylene originated from caps and closures),
- HDPE dairy packaging waste comprising colored layer and/or
- HDPE detergent packaging waste.

Preparation or Selection of the Virgin High Density Polyethylene Resin (HDPE)

The term "polyethylene resin" as used herein refers to the polyethylene fluff or powder that is extruded, and/or melted and/or pelleted and can be produced through compounding and homogenizing of the polyethylene resin as taught herein, for instance, with mixing and/or extruder equipment.

The term "fluff" or "powder" as used herein refers to the polyethylene material with the hard catalyst particle at the core of each grain and is defined as the polymer material after it exits the polymerization reactor (or final polymerization reactor in the case of multiple reactors connected in series).

The polyethylene resin has a multimodal molecular weight distribution, preferably a bimodal molecular weight distribution. As used herein, the term "polyethylene with a bimodal molecular weight distribution" or "bimodal polyethylene" it is meant, polyethylene having a distribution curve being the sum of two unimodal molecular weight distribution curves, and refers to a polyethylene product having two distinct but possibly overlapping populations of polyethylene macromolecules each having different weight average molecular weights. By the term "polyethylenes with a multimodal molecular weight distribution" or "multimodal polyethylenes" it is meant polyethylenes with a distribution curve being the sum of at least two, preferably more than two unimodal distribution curves, and refers to a polyethylene product having two or more distinct but possibly overlapping populations of polyethylene macromolecules each having different weight average molecular weights.

The virgin multimodal HDPE of the invention, preferably bimodal, is polymerized in presence of a Zielgler-Natta catalyst system. The requisite density and melt index desired in the polymer are obtained by proper control of the polymerization conditions including temperature, pressure, co-monomer concentration and hydrogen concentration in the reactors.

Ziegler-Natta polymerization catalysts are well known to the skilled person and are for example disclosed in more detail on pages 502 to 554 of Kirk-Othmer Encyclopedia of Chemical Technology, Fifth Edition, Volume 26, John Wiley & Sons, Inc. Hoboken, N.J., USA, 2007. A Ziegler-Natta catalyst includes a metal component generally represented by the formula:

$$MR^A{}_x;$$

wherein M is a transition metal, $R^A$ is a halogen, an alkoxy or a hydrocarboxyl group and x is the valence of the transition metal. For example, x may be from 1 to 4.

The transition metal may be selected from Groups IV through VIB (e.g., titanium, vanadium or chromium), for example. $R^A$ may be selected from chlorine, bromine, carbonates, esters, or alkoxy groups in one embodiment. Examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_{13}$.

In a preferred embodiment the Ziegler-Natta catalyst is a supported catalyst produced according to the process described in WO2005/032714, herewith enclosed by reference.

Other examples of Ziegler-Natta catalysts suitable for the invention and the process to produce them are described in U.S. Pat. No. 6,174,971, U.S. Pat. No. 6,486,274, U.S. Pat. No. 6,734,134, U.S. Pat. No. 6,693,058, U.S. Pat. No. 6,916,895, U.S. Pat. No. 6,864,207 and U.S. Pat. No. 6,930,071.

The catalyst may be "activated" in some way before it is useful for promoting polymerization. Activation may be accomplished by contacting the catalyst with an activator, which is also referred to in some instances as a "cocatalyst." Embodiments of such activators include organoaluminum compounds, such as trimethyl aluminum (TMAl), triethyl aluminum (TEAl), tri-n-octylaluminum (TNOAl), and tri-isobutyl aluminum (TIBAl), for example.

Optionally, the Ziegler-Natta catalyst system comprises one or more electron donors. Electron donors for use in the preparation of polyolefin catalysts are well known, and any suitable electron donor may be utilized in the present invention that will provide a suitable catalyst. A suitable external electron donor is for example a phtalate or a succinate or a diether compound.

The components of the Ziegler-Natta catalyst system (e.g., catalyst, activator and/or electron donors) may or may not be associated with a support, either in combination with each other or separate from one another. The Ziegler-Natta support materials may include a magnesium dihalide, such as magnesium dichloride or magnesium dibromide, or silica, for example.

Optionally, the Ziegler-Natta catalyst may be pre-polymerized. Generally, a pre-polymerization process is affected by contacting a small amount of monomer with the catalyst after the catalyst has been contacted with the preactivating agent. A pre-polymerization process is described in U.S. Pat. No. 5,106,804, U.S. Pat. No. 5,153,158 and U.S. Pat. No. 5,594,071.

According to the invention, the polyethylene resin has a multimodal molecular weight distribution and comprises at least two polyethylene fractions A and B, fraction A having a higher molecular weight and a lower density than fraction B. The fractions A and B are prepared in at least two different reactors operated in series or operated in parallel. Fraction A is the fraction of higher molecular weight (i.e. the HMW component) and fraction B is the fraction of lower molecular weight (i.e. the LMW component). The polyethylene resin is preferably obtained by operating the at least two reactors under different polymerization conditions.

If the at least two different reactors are operated in parallel, each fraction A and B are produced separately from each other and further blended together. However, preferably, the at least two different reactors are operated in series, i.e. with the at least two reactors connected in series defining a first reactor and a subsequent reactor. The two fractions A and B can be polymerized in any order. In an embodiment, fraction B (i.e. the LMW component) is polymerized in the first reactor and fraction A is polymerized in a subsequent reactor. In a preferred embodiment, fraction A (i.e. the HMW component) is polymerized in the first reactor and fraction B is polymerized in a subsequent reactor.

The polyethylene resin is prepared in two or more serially connected reactors, preferably loop reactors, more preferably slurry loop reactors, most preferably liquid full loop reactors in the presence of same or different Ziegler-Natta catalyst systems. The most preferred polymerization process is carried out in two serially connected slurry loop reactors, advantageously liquid full loop reactors i.e. a double loop reactor.

In a preferred embodiment, the polyethylene resin is prepared in at least two loop reactors connected in series, preferably under slurry condition.

In some embodiments, the polyethylene resin having a multimodal molecular weight distribution, preferably bimodal molecular weight distribution, is prepared using a process comprising the steps of:

(a) feeding ethylene monomer, a diluent, at least one Ziegler-Natta catalyst, optionally hydrogen, and optionally one or more olefin co-monomers into at least one first slurry loop reactor; polymerizing the ethylene monomer, and the optionally one or more olefin co-monomers, in the presence of the Ziegler-Natta catalyst, and optional hydrogen, in said first slurry loop reactor to produce a first polyethylene fraction;

(b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing the polyethylene resin.

As used herein, the term "co-monomer" refers to olefin co-monomers which are suitable for being polymerized with ethylene monomers. Co-monomers may comprise but are not limited to aliphatic $C_3$-$C_{20}$ alpha-olefins. Examples of suitable aliphatic $C_3$-$C_{20}$ alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene. Preferably, the co-monomer 1-hexene.

As used herein, the term "diluent" refers to diluents in a liquid state, liquid at room temperature and preferably liquid under the pressure conditions in the loop reactor. Diluents which are suitable for being used in accordance with the present invention may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are isobutane, butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane.

In an preferred embodiment, the polyethylene resin has a bimodal molecular weight distribution and comprises two polyethylene fractions A and B, fraction A having a higher molecular weight and a lower density than fraction B, with each fraction being prepared in different reactors of at least two slurry loop reactors connected in series.

The polymerization steps in the at least two loop reactors, i.e. in the first loop reactor and the second loop reactor, can be performed over a wide temperature range. In certain embodiments, the polymerization step in the first loop reactor and/or in the second loop reactor may be performed at a temperature from 20° C. to 125° C., preferably from 60° C. to 110° C., more preferably from 75° C. to 100° C. and most preferably from 78° C. to 98° C. Preferably, the temperature in the first loop reactor and in the second loop reactor range may be within the range from 75° C. to 100° C. and most preferably from 78° C. to 98° C.

In certain embodiments, the polymerization step in the first loop reactor and/or in the second loop reactor may be performed at a pressure from about 20 bar to about 100 bar, preferably from about 30 bar to about 50 bar, and more preferably from about 37 bar to about 45 bar.

Fraction A has a density of at least 0.920 g/cm³ and of at most 0.942 g/cm³, preferably of at least 0.930 g/cm³ and of at most 0.942 g/cm³, preferably of at most 0.940 g/cm³, more preferably of at most 0.938 g/cm³, for example of at least 0.930 g/cm³ to at most 0.938 g/cm³, as measured according to ASTM 1505 at a temperature 23° C.

Fraction A has a melt index HL275 of at least 0.1 g/10 min, preferably of at least 0.2 g/10 min, and of at most 4 g/10 min as measured according to ISO 1133 condition G at a temperature of 190° C. and under a load of 21.6 kg, except that a die of 2.75 mm broad was used. The HL275 index is preferably of at least 0.5 g/10 min, more preferably of at least 0.8 g/10 min and preferably of at most 1.9 g/10 min. The HLMI can be calculated from the HL275 as follows:

$$HLMI=HL275/3.2.$$

In some embodiments, fraction A is present in an amount ranging from at least 40% to at most 50% by weight based on the total weight of the virgin polyethylene resin; preferably ranging from 40% to 45% by weight based on the total weight of the virgin polyethylene resin.

The density of fraction B is linked to that of the density of fraction A by the following expression:

$$d=W_A*d_A+(1-W_A)*d_B$$

wherein d is the density of the final polyethylene fluff, $W_A$ is the weight fraction of fraction A, $d_A$ is the density of fraction A, $d_B$ is the density of fraction B, and wherein the sum of both fractions A and B by weight ($W_A+W_B$) is 1.

In some embodiments, fraction B has a density of at least 0.970 g/cm³, preferably of at least 0.972 g/cm³, more preferably of at least 0.973 g/cm³, and of at most 0.980 g/cm³, preferably of at most 0.978 g/cm³, more preferably of at most 0.975 g/cm³, as measured according to ASTM 1505 at a temperature 23° C.

The HLMI of fraction B is linked to that of the HLMI of fraction A by the following expression:

$$\text{Log } HLMI_{final}=W_A \times \text{Log } HLMI_A + W_B \times \text{Log } HLMI_B$$

wherein Log $HLMI_{final}$ is the Log HLMI of the final polyethylene fluff, $W_A$ is the weight fraction of fraction A, Log $HLMI_A$ is the Log HLMI of fraction A, Log $HLMI_B$ is the Log HLMI of fraction B, and wherein the sum of both fractions A and B by weight ($W_A+W_B$) is 1.

In some embodiments, fraction B has a HLMI of at least 250 g/10 min, and of at most 700 g/10 min as measured according to ISO 1133 condition G at a temperature of 190° C. and under a load of 21.6 kg. Preferably, HLMI is of at least 300 g/10 min and of at most 600 g/10 min, preferably at most 500 g/10 min.

In some embodiments, the virgin Ziegler-Natta catalyzed polyethylene resin has a multimodal molecular weight distribution and comprises at least two polyethylene fractions A and B, fraction A having a higher molecular weight and a lower density than fraction B, each fraction prepared in different reactors of at least two reactors preferably connected in series, wherein fraction A has a HL275 of at least 0.1 g/10 min, preferably at least 0.2 g/10 min, more preferably at least 0.5 g/10 min, more preferably of at least 0.8 g/10 min and even more preferably of at least 0.9 g/10 min, and of at most 4 g/10 min, preferably of at most 1.9 g/10 min, as determined according to ISO 1133, condition G, at 190° C. and under a load of 21.6 kg except that a die of 2.75 mm broad was used; and has a density of at least 0.920 g/cm$^3$, preferably at least 0.930 g/cm$^3$, and of at most 0.942 g/cm$^3$, preferably of at most 0.940 g/cm$^3$, more preferably of at most 0.939 g/cm$^3$, even more preferably of at most 0.938 g/cm$^3$, as determined according to ASTM 1505 at a temperature of 23° C.; and the virgin polyethylene resin having an HLMI of 5 to 30 g/10 min, preferably 15 to 30 g/10 min as determined according to ISO 1133, condition G, at 190° C. and under a load of 21.6 kg, a density ranging from 0.945 to 0.960 g/cm$^3$, preferably from 0.955 to 0.959 g/cm$^3$, as determined according to ASTM 1505 at a temperature of 23° C.; and preferably wherein fraction A is present in an amount ranging from at least 40% to at most 50% by weight based on the total weight of the virgin polyethylene resin; preferably ranging from 40% to 45% by weight based on the total weight of the virgin polyethylene resin.

Preferably, the virgin polyethylene used herein has a molecular weight distribution, defined as $M_w/M_n$, i.e. the ratio of weight average molecular weight $M_w$ and number average molecular weight $M_n$, of at least 10, more preferably of at least 11, and most preferably of at least 12. Molecular weights can be determined by size exclusion chromatography (SEC), frequently also referred to as gel permeation chromatography (GPC), as indicated in the test methods.

The virgin polyethylene is preferably characterized by a density of at least 0.945 g/cm$^3$, preferably at least 0.953 g/cm$^3$, more preferably of at least 0.954 g/cm$^3$, and more preferably of at least 0.955 g/cm$^3$. The virgin polyethylene is preferably characterized by a density of at most 0.960 g/cm$^3$, preferably of at most 0.959 g/cm$^3$ as determined according to ASTM 1505 at a temperature of 23° C.

Preferably the HLMI of the virgin polyethylene is of at least 10 g/10 min, preferably at least 12 g/10 min, and more preferably of at least 15 g/10 min. The HLMI of the virgin polyethylene is at most 50 g/10 min and more preferably at most 30 g/10 min as determined according to ISO 1133, condition G, at 190° C. and under a load of 21.6 kg. More preferably the HLMI of the virgin polyethylene is ranging from 5 to 30 g/10 min.

The virgin Ziegler-Natta catalyzed polyethylene resin has an ESCR (10%) of at least 80 hours, preferably at least 150 hours, more preferably of at least 600 hours.

Selection of the Post Consumer Resin (PCR)

Preferably the PCR used in the inventive process is coming from a selective collection of dairy packaging waste. However, any PCR fulfilling the requirements of the invention may be used.

The PCR is selected to show an HLMI ranging between 40 and 70 g/10 min. Preferably the HLMI is at most 60 g/10 min, more preferably at most 55 g/10 min.

The PCR is selected to show a density of at least 0.950 g/cm$^3$, preferably 0.954 g/cm$^3$, more preferably of at least 0.957 g/cm$^3$. Preferably, the PCR is selected to show a density of at most 0.967 g/cm$^3$, more preferably of at most 0.964 g/cm$^3$.

Preferably the PCR is selected to have a natural light color. The PCR is characterized by coordinates L*, a* and b* according to CIE 1976 color space. The value of L* is at least 60, preferably at least 70. The value of a* is ranging from −10 to 0, preferably from −5 to 0. The value of b* is ranging from 0 to 10, preferably from 0 to 5. The measurements were performed on pellets.

Preferably, said PCR is characterized by comprising at most 40 ppm, more preferably at most 25 ppm of limonene (1-methyl-4-(1-methylethenyl)-cyclohexene, CAS-nr. 5989-27-5). The content of limonene in the PCR can be determined as indicated in the test methods.

For example, a suitable PCR is from English milk bottles. The choice of dairy packaging waste is made in order to obtain PCR having the required properties in terms of their natural color and with stable properties and low odor. According to the invention the selected PCR has a poor ESCR (100%) of less than 10 hours.

Following its collection, the PCR needs to be processed. The processing comprises the steps of:
  recovering the non-colored HDPE dairy packaging waste from the domestic polymer waste by separating it,
  grinding, and
  cleaning.

The above steps may be performed in any order. The separation of domestic waste into several fraction such as non-colored HDPE dairy packaging waste can be performed by any method generally used in the industry such as near-infrared analysis (NIR), wherein the respective polymers are identified by their NIR-fingerprint. Further separation can be made according to colour according to known separation system.

Cleaning is preferably done in a liquid bath. The preferred liquid is water. Depending upon the density of the liquid, the cleaning step may also be used to eliminate undesired components of the domestic polymer waste. For example, polyethylene and polypropylene waste will generally float on water, while components such as metal sink.

Preferably the grinding step is performed so as to obtain the PCR in a flake form.

Preparation of the Composition

In accordance with the invention, a polyethylene composition is made from a blend of post consumer resin (PCR) and a virgin bimodal high density polyethylene (HDPE). Preferably, the PCR is blended to the bimodal HDPE in a flake form, i.e. shredded and cleaned but not compounded. Preferably, the bimodal HDPE is blended to the PCR in the powder form, i.e. as taken at the exit of the polymerization reactor. The avoidance of using pellets for the PCR and/or the bimodal HDPE in the inventive process allows avoiding multiples extrusions, consequent energy consumption and polymer degradation. However, it is possible to use pellets for the PCR and/or the bimodal HDPE in the inventive process.

The post consumer resin (PCR) and a bimodal high density polyethylene (HDPE) are blended in an extruder. The composition obtained can be used in blow molding applications to produce articles such as containers.

For blow moulding applications, it is desirable that the polyethylene composition has an HLMI ranging from 20 to 50 g/10 min (for processability), a density ranging from 0.957 to 0.962 g/cm³ (to achieve a good rigidity), and a good ESCR (100%) of at least 80 hours, with preference the ESCR (100%) is of at least 500 hours.

The virgin polyethylene resin used in the composition has preferably a HLMI ranging from 5 to 30 g/10 min. The percentage of PCR in the blend may be adapted according to the HLMI of the virgin resin used in the blend. Indeed for virging resin having an HLMI of from 5 to 15 g/10 min a percentage of 50 wt % or more of PCR in the polyethylene composition may be used in order to obtain a polyethylene composition with a HLMI in the targeted range of from 20 to 50 g/10 min.

In a preferred embodiment the polyethylene composition has an HLMI of 20 to 50 g/10 min as determined according to ISO 1133, condition G, at 190° C. and 21.6 kg, and wherein the polyethylene composition satisfies the relationship $$HLMIcomp = \left(\frac{1-[PCR]}{HMLIvr} + \frac{[PCR]}{HMLIpcr}\right)^{-1}$$

wherein HLMIcomp is the HLMI of the polyethylene composition, HLMIvr is the HLMI of the virgin Ziegler-Natta catalyzed polyethylene resin, HLMIpcr is the HLMI of the high density polyethylene post consumer resin, [PCR] is the proportion of the high density polyethylene post consumer resin in the polyethylene composition relative to the total weight of the composition such that [PCR]=wt % PCR/100, and wt % PCR is the proportion in weight percent of the high density polyethylene post consumer resin in the polyethylene composition relative to the total weight of the composition.

The polyethylene composition preferably shows good ESCR (100%) properties, i.e. having a F50 time of at least 80 hours, preferably at least 140 hours, more preferably at least 500 hours with the F50 time being determined as described in the tests methods.

The ESCR (100%) of the polyethylene composition obtained according to the invention can be raised by lowering the percentage of the high density polyethylene post consumer resin contained in the blend.

In an embodiment, the polyethylene composition has a density ranging from 0.957 to 0.962 g/cm³ as determined according to ASTM 1505 at a temperature of 23° C., an HLMI of 20 to 50 g/10 min as determined according to ISO 1133, condition G, at 190° C. and 21.6 kg, and preferably one or more selected from:
  a color L* of at least 60, a*=−10 to 0 and b*=0 to 10;
  at most 40 ppm, more preferably at most 25 ppm of limonene.

In a preferred embodiment of the invention, the polyethylene composition satisfies the relationship:

$$wt\ \%\ PCR \leq 74-(14.4 \times HL275_A)$$

wherein wt % PCR is the proportion in weight percent of the high density polyethylene post consumer resin in the composition relative to the total weight of the composition and $HL275_A$ is the HL275 of fraction A of the virgin Ziegler-Natta catalyzed polyethylene resin as determined according to ISO 1133, condition G, at 190° C. and under a load of 21.6 kg except that a die of 2.75 mm broad was used. Indeed, it has surprisingly been discovered by the inventors that the HL275 of fraction A of the virgin Ziegler-Natta catalyzed polyethylene resin could provide a guidance to the man skilled in the art to determine an amount (for example to determine the maximal amount) of high density polyethylene post consumer resin that can be used in the composition in order to obtain a composition with the desired mechanical properties such as an ESCR of at least 80 hours.

The polyethylene composition may be produced by common blending methods, such as for example dry blending of the components of the polyethylene composition and subsequent melt-extrusion of the blended components. To improve homogeneity of the polyethylene blend it is, however, preferred to first blend and then melt-extrude on a high shear extruder, such as for example a twin-screw extruder.

The polyethylene composition can also be produced by blending of the different components in a single screw extruder, each component being feed directly into the extruder, preferably by main feed.

The polyethylene composition comprises at least 15 wt %, preferably at least 17 wt %, more preferably at least 25 wt %, and more preferably at least 35 wt % of said PCR, relative to the total weight of the polyethylene composition. The polyethylene composition comprises at most 70 wt %, preferably at most 50 wt %, more preferably at most 45 wt % and even more preferably at most 40 wt % of said PCR, relative to the total weight of the polyethylene composition.

The polyethylene composition comprises at most 85 wt %, preferably at most 83 wt %, more preferably at most 75 wt %, and more preferably at most 60 wt % of virgin polyethylene, relative to the total weight of the polyethylene composition. The polyethylene composition comprises at least 30 wt %, preferably at least 50 wt %, more preferably at least 55 wt % of virgin polyethylene, relative to the total weight of the polyethylene composition.

In addition to any other thermoplastic polymer comprised in the recycled high density polyethylene, the polyethylene composition may comprise other thermoplastic polymers in a minor amount, such as for example in at most 10 wt %, preferably in at most 5 wt %, more preferably in at most 2 wt % relative to the total weight of the polyethylene composition. It is nevertheless preferred that the polyethylene composition consists of recycled high density polyethylene (PCR) and virgin polyethylene.

Independently of the number of components comprised in the polyethylene composition, it is clear that their relative percentages in wt % add up to a total of 100 wt %.

Both, the recycled high density polyethylene (PCR) as well as the virgin polyethylene may comprise additives, such as by way of example, antioxidants, light stabilizers, acid scavengers, lubricants, antistatic additives, nucleating agents, and colorants. An overview of such additives may be found in Plastics Additives Handbook, ed. H. Zweifel, 5th edition, 2001, Hanser Publishers.

Tests Methods

The high load melt index (HLMI) of polyethylene and polyethylene compositions was determined according to ISO 1133, condition G, at 190° C. and 21.6 kg.

The melt index MI2 was measured according to the method of standard ISO 1133, condition D, at 190° C. and under a load of 2.16 kg.

HL275 was measured according to the method of standard ISO 1133, condition G, at 190° C. and under a load of 21.6 kg except that a die of 2.75 mm broad was used.

The density was measured according to the method of standard ASTM 1505 at a temperature of 23° C.

Charpy impact strength was measured according to ISO 179 at 23° C.

Environmental stress cracking resistance (ESCR) was determined in accordance with ASTM D 1693 (2013) following conditions "B", i.e. at a bath temperature of 50° C., using as surfactant Igepal CO 630 (branched polyoxyethylene nonylphenylether, CAS-nr. 68412-54-4, available for example from Sigma-Aldrich Co.) in pure form (100%) or in diluted form (10% diluted in distilled water). The material to be tested was compression molded into plates of the required thickness, out of which 10 test specimens were punched. The test specimens were conditioned between 40 hours and 96 hours at 23° C., then notched, bent and placed in the bath. To check for the appearance of cracks, a robot removed the test specimens from the bath once every hour, took a picture of the test specimen and replaced them in the bath. Once cracks had been detected on all test specimens, the F50 time, i.e. the time after which 50% of test specimens are considered "broken", was calculated. The results are given as "F50" in hours.

Color was determined as L*, a* and b* under the CIE standard using a BYK Gardner Spectro-guide Sphere gloss S, working in transmission mode in the wavelength range between 400 nm and 700 nm in 10 nm steps with an observation angle of 10° and illumination of D65. The spectrophotometer is calibrated with a standard white and a black. The measurements were performed on pellets, with a sufficient thickness to not be influenced by the background.

The content of limonene in a polymer can be determined as follows: between 30 and 60 mg of polymer were placed in a PerkinElmer TurboMatrix ATD and kept at 150° C. for 15 min inside a glass tube, from which volatile compounds were carried away by means of a stream of helium and condensed at −30° C. in a trap. The condensed volatile compounds were removed from the trap by heating to 250° C. for 10 min. The volatile compounds were then injected into a gas chromatograph with flame ionization detector (FID). The gas chromatograph was equipped with HP-5 or equivalent columns using 5% Ph-Me-siloxane in a thickness of 1 μm. The columns had a length of 60 m, and an internal diameter of 0.32 mm. 1-hexene served as external standard.

The molecular weight ($M_n$ (number average molecular weight), $M_w$ (weight average molecular weight), $M_z$ (z average molecular weight) and molecular weight distributions d (Mw/Mn) and d' (Mz/Mw) were determined by size exclusion chromatography (SEC) and in particular by gel permeation chromatography (GPC). Briefly, a GPC-IR5 from Polymer Char was used: 10 mg polyethylene sample was dissolved at 160° C. in 10 mL of trichlorobenzene for 1 hour. Injection volume: about 400 μL, automatic sample preparation and injection temperature: 160° C. Column temperature: 145° C. Detector temperature: 160° C. Two Shodex AT-806MS (Showa Denko) and one Styragel HT6E (Waters) columns were used with a flow rate of 1 mL/min. Detector: Infrared detector (2800-3000 cm$^{-1}$). Calibration: narrow standards of polystyrene (PS) (commercially available). Calculation of molecular weight Mi of each fraction i of eluted polyethylene is based on the Mark-Houwink relation ($\log_{10}(M_{PE})$=0.965909−$\log_{10}(M_{PS})$−0.28264) (cut off on the low molecular weight end at $M_{PE}$=1000).

The molecular weight averages used in establishing molecular weight/property relationships are the number average ($M_n$), weight average ($M_w$) and z average ($M_z$) molecular weight. These averages are defined by the following expressions and are determined form the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i M_i} = \frac{\sum_i h_i M_i}{\sum_i M_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

EXAMPLES

The advantages of the inventive polyethylene compositions are shown in the following examples.

Example 1: Selection of the PCR

Table 1 displays the properties of the PCR used in the composition.

TABLE 1

| Form | Flakes |
|---|---|
| Density (g/cm$^3$) | 0.962 |
| MI2 (g/10 min) | 0.7 |
| HLMI (g/10 min) | 50 |
| ESCR (100%) in hours | 6 |
| Colour property L* | 64.8 |
| Colour property a* | −3.5 |
| Colour property b* | 1.08 |
| Limonene (ppm) | 21 |
| Mn | 16217 |
| Mw | 121271 |
| Mz | 954203 |
| MWD | 7.5 |

Example 2: Preparation or Selection of the Virgin HDPE

Bimodal Ziegler-Natta produced polyethylene resins have been produced. R1 to R5 are resins in accordance with the invention.

TABLE 2

| | Resin | | | | |
|---|---|---|---|---|---|
| | R1 | R2 | R3 | R4 | R5 |
| Catalyst | ZN | ZN | ZN | ZN | ZN |
| Activating agent | TEAL | TEAL | TEAL | TEAL | TEAL |
| | 50 ppm | 50 ppm | 50 ppm | 50 ppm | 50 ppm |
| Temperature in Rx1 (° C.) | 87 | 87 | 87 | 87 | 90 |
| Temperature in Rx2 (° C.) | 95 | 95 | 95 | 95 | 95 |
| Pressure in both reactors (bar) | 40 | 40 | 40 | 40 | 40 |
| Hexene in Rx1 (C6/C2-feed) | 0.030 | 0.038 | 0.044 | 0.027 | 0.026 |
| Density (g/cm$^3$) | 0.959 | 0.955 | 0.955 | 0.959 | 0.955 |
| HLMI (g/10 min) | 29 | 16.7 | 18.5 | 26 | 6 |
| Mw | 12457 | 14354 | 14169 | 13258 | ND |
| Mn | 175188 | 212780 | 226295 | 162908 | ND |
| Mz | 1259846 | 1541904 | 1777563 | 914430 | ND |
| MWD | 14.1 | 14.8 | 16.0 | 12.3 | ND |
| ESCR 10% (hours) | 177 | 652 | >1087 | 80 | 603 |
| ESCR 100% (hours) | >1278 | >1087 | >1087 | 300 | >1000 |
| | First reactor | | | | |
| Fraction wt % | 43 | 43.5 | 40 | 48 | 43 |
| Density (g/cm$^3$) | 0.939 | 0.932 | 0.931 | 0.941 | 0.934 |
| HL275$_A$ (g/10 min) | 2 | 1.2 | 0.9 | 3.06 | 0.28 |
| | Second reactor | | | | |
| Calc. density (g/cm$^3$) | 0.974 | 0.973 | 0.973 | 0.976 | 0.971 |
| Calc. HLMI (g/10 min) | 524 | 301 | 288 | 548 | 146 |

ND = not determined

Rx1 is the first reactor and Rx2 is the second reactor of two loop reactors operated in series in slurry conditions.

Table 3 displays the properties of virgin HDPE prepared with metallocene or chromium catalysts. These resins are used as comparative material. R6 has a bimodal molecular weight distribution. R7 and R8 are monomodal.

TABLE 3

| | resin | | |
|---|---|---|---|
| | R6 | R7 | R8 |
| Density (g/cm$^3$) | 0.953 | 0.957 | 0.949 |
| HLMI (g/10 min) | 6 | 22 | 8 |
| ESCR 10% (h) | 179 | 32 | 222 |
| Catalyst | Metallocene | Chromium | Chromium |
| Mn | ND | 16154 | ND |
| Mw | ND | 182207 | ND |
| Mz | ND | 2014944 | ND |
| MWD | ND | 11.3 | 12.9 |

ND = not determined

Example 3: Preparation of the Polyethylene Composition

Polyethylene compositions made from a blend of PCR and virgin HDPE have been produced. In all examples, the same PCR was used.

The blends have been compounded on by classical twin-extrusion process on a extruder CLEXTRAL BC45 with a filtration at 200 μm. The barrel temperature used was 230° C. and the screw speed was 50 rpm. The throughput was ranging between 8 and 12 kg/h. The barrel diameter was 50 mm and the L/D was 32.

Table 4 displays the properties of the polyethylene composition produced.

TABLE 4

| | B1 | B2 | B3 | B4 | CB1 | CB2 | CB3 | CB4 |
|---|---|---|---|---|---|---|---|---|
| Virgin resin | R1 | R2 | R3 | R4 | R5 | R6 | R7 | R8 |
| PCR (wt %) in blend | 25 | 40 | 40 | 25 | 40 | 40 | 25 | 40 |
| Filtration (μm) | 200 | 200 | 200 | 200 | 200 | 200 | 200 | 200 |
| Barrel temperature (° C.) | 230 | 230 | 230 | 230 | 230 | 230 | 230 | 230 |
| Screw speed (rpm) | 50 | 50 | 50 | 50 | 50 | 50 | 50 | 50 |
| Throughput (kg/h) | 11 | 10 | 9.7 | 9 | 8.7 | 8.8 | 11 | 8.6 |
| Density (g/cm$^3$) | 0.960 | 0.958 | 0.959 | 0.959 | 0.960 | 0.958 | 0.959 | 0.955 |
| HLMI (g/10 min) | 24 | 22.2 | 24.7 | 33 | 10.6 | 15 | 23.4 | 12.4 |
| ESCR 10% (h) | 57 | 103 | 98 | ND | 168 | 53 | 24 | 62 |
| ESCR 100% (h) | 148 | 717 | 811 | 81 | 1028 | 190 | 39 | 405 |
| Colour property L* | 66.6 | 67.4 | 68.3 | 71.6 | 65.5 | 61.9 | 67.4 | 64.7 |
| Colour property a* | −2.43 | −2.74 | −3.24 | −4.42 | −2.47 | −2.07 | −2.50 | −2.27 |

TABLE 4-continued

| | B1 | B2 | B3 | B4 | CB1 | CB2 | CB3 | CB4 |
|---|---|---|---|---|---|---|---|---|
| Colour property b* | 0.6 | 1.12 | 2.41 | 4.62 | 0.79 | 0.64 | 1.07 | 0.44 |
| Limonene (ppm)[++] | 5 | 8 | 8 | 5 | 8 | 8 | 5 | 8 |

[++]calculated results

From the examples, it is shown that the balance of the desired properties is not obtained for compositions comprising virgin HDPE produced from metallocene catalysts or chromium catalysts.

Surprising good results are obtained with the compositions produced from the resins R2 and R3. Indeed, an ESCR (100%) of 700 hours or more can be obtained in compositions comprising 40 wt % of a PCR (showing an initial ESCR of 6 h). In comparison, prior art compositions (see WO2012/139967) showed an ESCR (100%) of 440 hours in compositions comprising 40 wt % of a PCR (showing an initial ESCR (100%) of 60 hours). The inventive compositions have the additional advantage of having improved colour and smell properties compared to those disclosed in WO2012/139967.

The invention claimed is:

1. A process to produce a polyethylene composition comprising post consumer resin (PCR) comprising the steps of:
providing a high density polyethylene post consumer resin (PCR) having an ESCR (100%) of at most 10 hours as determined according to ASTM D 1693 (2013) condition B, a density ranging from 0.950 to 0.967 g/cm³ as determined according to ASTM 1505 at a temperature of 23° C., an HLMI of 40 to 70 g/10 min as determined according to ISO 1133, condition G, at 190° C. and 21.6 kg;
providing a virgin Ziegler-Natta catalyzed polyethylene resin, wherein the virgin Ziegler-Natta catalyzed polyethylene resin has a multimodal distribution and comprises at least two polyethylene fractions A and B, fraction A having a higher weight average molecular weight and lower density than fraction B, wherein fraction A has a HL275 of at least 0.1 g/10 min and of at most 4 g/10 min as determined according to ISO 1133, condition (G, at 190° C. and under a load of 21.6 kg wherein a die of 2.75 mm broad was used and has a density of at least 0.920 g/cm³ and of at most 0.942 g/cm³; and wherein the virgin Ziegler-Natta catalyzed polyethylene resin has an HLMI of 5 to 75 g/10 min as determined according to ISO 1133, condition G, at 190° C. and 21.6 kg, a density ranging from 0.945 to 0.960 g/cm³, the density being determined according to ASTM 1505 at a temperature of 23° C.;
blending the high density polyethylene post consumer resin with the virgin Ziegler-Natta catalyzed polyethylene resin in to form a polyethylene composition, wherein said polyethylene composition comprises from 15 to 70 wt % of the high density polyethylene post consumer resin relative to the total weight of the polyethylene composition, wherein the polyethylene composition has an HLMI of 20 to 50 g/10 min as determined according to ISO 1133, condition G, at 190° C. and 21.6 kg, and wherein the polyethylene composition satisfies the relationship $$HLMIcomp = \left(\frac{1-[PCR]}{HMLIvr} + \frac{[PCR]}{HMLIpcr}\right)^{-1}$$

wherein HLMIcomp is the HLMI of the polyethylene composition, HLMIvr is the HLMI of the virgin Ziegler-Natta catalyzed polyethylene resin, HLMIpcr is the HLMI of the high density polyethylene post consumer resin, [PCR] is the proportion of the high density polyethylene post consumer resin in the polyethylene composition relative to the total weight of the polyethylene composition such that [PCR]=wt % PCR/100, and wt % PCR is the proportion in weight percent of the high density polyethylene post consumer resin in the polyethylene composition relative to the total weight of the polyethylene composition.

2. The process according to claim 1, wherein the polyethylene composition satisfies the relationship: wt % PCR≤74−(14.4×HL275$_A$), wherein wt % PCR is the proportion in weight percent of the high density polyethylene post consumer resin in the polyethylene composition relative to the total weight of the polyethylene composition and HL275$_A$ is the HL275 of fraction A of the virgin Ziegler-Natta catalyzed polyethylene resin as determined according to ISO 1133, condition G, at 190° C. and under a load of 21.6 kg wherein a die of 2.75 mm broad was used.

3. The process according to claim 1, wherein the high density polyethylene post consumer resin has a color L* of at least 60, a*=−10 to 0 and b*=0 to 10.

4. The process according to claim 1, wherein the high density polyethylene post consumer resin comprises at most 40 ppm of limonene.

5. The process according to claim 1, wherein the high density polyethylene post consumer resin is provided in flake form or in pellet form.

6. The process according to claim 1, wherein the virgin Ziegler-Natta catalyzed polyethylene resin is a bimodal HDPE provided in powder form or in pellet form.

7. The process according to claim 1, wherein the high density polyethylene post consumer resin is a dairy waste.

8. The process according to claim 1, wherein the polyethylene composition comprises from 25 to 40 wt % of the high density polyethylene post consumer resin relative to the total weight of the polyethylene composition.

9. The process according to claim 1, further characterized in that fraction A of the virgin Ziegler-Natta catalyzed polyethylene resin, has a melt index HL275 of at least 0.5 g/10 min, and of at most 4 g/10 min, as measured according to ISO 1133 condition G at a temperature of 190° C. and under a load of 21.6 kg, wherein a die of 2.75 mm broad was used.

10. The process according to claim 1, further characterized in that fraction A of the virgin Ziegler-Natta catalyzed polyethylene resin, has a density of at least 0.930 g/cm³ and of at most 0.940 g/cm³, as measured according to ASTM 1505 at a temperature 23° C.

11. The process according to claim 1, further characterized in that fraction A is present in an amount ranging from at least 40% to at most 50% by weight based on the total weight of the virgin Ziegler-Natta catalyzed polyethylene resin.

12. The process according to claim 1, wherein at least one of the following is true:
fractions A and B of the virgin Ziegler-Natta catalyzed polyethylene resin are prepared in different reactors and/or fractions A and B of the virgin Ziegler-Natta catalyzed polyethylene resin are prepared in at least 2 reactor.

13. The process according to claim 1, wherein the virgin Ziegler-Natta catalyzed polyethylene resin is prepared in slurry conditions.

14. The process according to claim 1, wherein the virgin Ziegler-Natta catalyzed polyethylene resin has a molecular weight distribution of at least 10.

15. The process according to claim 1, wherein the polyethylene composition has a density ranging from 0.957 to 0.962 g/cm$^3$ as determined according to ASTM 1505 at a temperature of 23° C., an HLMI of 20 to 50 g/10 min as determined according to ISO 1133, condition G, at 190° C. and 21.6 kg.

16. An article made from the polyethylene composition obtained by the process according to claim 1.

17. The article of claim 16, wherein the article is a blow molded article.

18. A process comprising:
providing a high density polyethylene having an ESCR (100%) of at most 10 hours as determined according to ASTM␣D␣1693 (2013) condition B, a density ranging from 0.950 to 0.967 g/cm$^3$ as determined according to ASTM 1505 at a temperature of 23° C., an HLMI of 40 to 70 g/10 min as determined according to ISO 1133, condition G, at 190° C. and 21.6 kg;
providing a Ziegler-Natta catalyzed polyethylene resin, wherein the Ziegler-Natta catalyzed polyethylene resin has a multimodal distribution and comprises at least two polyethylene fractions A and B, fraction A having a higher weight average molecular weight and lower density than fraction B, wherein fraction A has a HL275 of at least 0.1 g/10 min and of at most 4 g/10 min as determined according to ISO 1133, condition G, at 190° C. and under a load of 21.6 kg wherein a die of 2.75 mm broad was used and has a density of at least 0.920 g/cm$^3$ and of at most 0.942 g/cm$^3$; and wherein the Ziegler-Natta catalyzed polyethylene resin has an HLMI of 5 to 75 g/10 min as determined according to ISO 1133, condition G, at 190° C. and 21.6 kg, a density ranging from 0.945 to 0.960 g/cm$^3$, the density being determined according to ASTM 1505 at a temperature of 23° C.;
blending the high density polyethylene with the Ziegler-Natta catalyzed polyethylene resin in to form a polyethylene composition, wherein said polyethylene composition comprises from 15 to 70 wt % of the high density polyethylene relative to the total weight of the polyethylene composition, wherein the polyethylene composition has an HLMI of 20 to 50 g/10 min as determined according to ISO 1133, condition G, at 190° C. and 21.6 kg, and wherein the polyethylene composition satisfies the relationship $$HLMIcomp = \left(\frac{1-[PCR]}{HMLIvr} + \frac{[PCR]}{HMLIpcr}\right)^{-1}$$

wherein HLMIcomp is the HLMI of the polyethylene composition, HLMIvr is the HLMI of the Ziegler-Natta catalyzed polyethylene resin, HLMIpcr is the HLMI of the high density polyethylene, [PCR] is the proportion of the high density polyethylene in the polyethylene composition relative to the total weight of the polyethylene composition such that [PCR]=wt % PCR/100, and wt % PCR is the proportion in weight percent of the high density polyethylene in the polyethylene composition relative to the total weight of the polyethylene composition.

* * * * *